Sept. 27, 1966  J. D. KODY ET AL  3,275,350

FITTING

Filed June 25, 1964

INVENTORS.
Joseph D. Kody,
BY Arthur M. Rabin
Hofgren, Wegner, Allen,
Stellman & McCord Attys.

United States Patent Office 3,275,350
Patented Sept. 27, 1966

3,275,350
FITTING
Joseph D. Kody, Arlington Heights, and Arthur M. Rabin, Des Plaines, Ill., assignors to Imperial-Eastman Corporation, a corporation of Illinois
Filed June 25, 1964, Ser. No. 377,883
2 Claims. (Cl. 285—341)

This invention relates to tube fittings, and in particular to flexible tube fittings.

In the George E. Franck, United States Patent No. 2,405,822, an improved sealed flexible coupling is disclosed for use in flexibly connecting tubing such as thin wall tubing. The present invention comprehends an improved fitting of the type disclosed in the Franck patent, providing a number of highly desirable features not found in the known fittings of this type.

Thus, a principal object of the present invention is the provision of a new and improved fitting for resiliently connecting a tube.

Another object of the invention is the provision of such a fitting having new and improved tube gripping means for retaining the tube against blow out from the fitting.

A further object of the invention is the provision of such a fitting having a new and improved resilient sleeve structure for resiliently supporting the tubing in the fitting.

Still another object of the invention is the provision of such a fitting including a body member having an outer end portion and a flow passage opening coaxially through the end portion, a nut member having an inner end, a bore opening through the inner end, and an outer portion defining an axially inwardly facing bore shoulder, means for connecting the inner end of the nut member to the outer end of the body member, a resilient annular sleeve in the bore, the sleeve having an outer end, and an inner end abutting the body member end portion coaxially of the flow passage, and an annular gripper having an outer end defining an axially outer bearing surface engaged by the shoulder of the nut member to urge the gripper axially inwardly as an incident of axially inward movement of the nut member relative to the body member, an axially inner radial shoulder engaging the outer end of the sleeve, and an inner portion comprising a thin tubular wall having a frusto-conical, axially inwardly narrowing, radially outer surface, an axially inner, constrictible tip portion defining a radially inner cylindrical surface, an axially outer deflectable portion defining a radially inner cylindrical surface having a diameter larger than that of the cylindrical surface of the tip portion and projecting means extending radially inwardly from the cylindrical surface of the deflectable portion for biting into a tube extending coaxially in the nut member bore, the gripper, and the sleeve, the inner portion of the gripper being arranged in the made-up arrangement of the fitting to extend coaxially within and be transaxially resiliently supported by the outer end of the sleeve and the inner portion of the gripper being arranged to constrictively deform the tube and transaxially resiliently support the tube in the sleeve.

Yet another object of the invention is the provision of such a tube fitting wherein the gripper is of an improved novel construction.

Another object of the invention is the provision of such a fitting wherein the resilient sleeve is of an improved novel construction.

Other objects and advantages of the invention will be apparent from the following description taken in connection with the accompanying drawing wherein.

Figure 1:
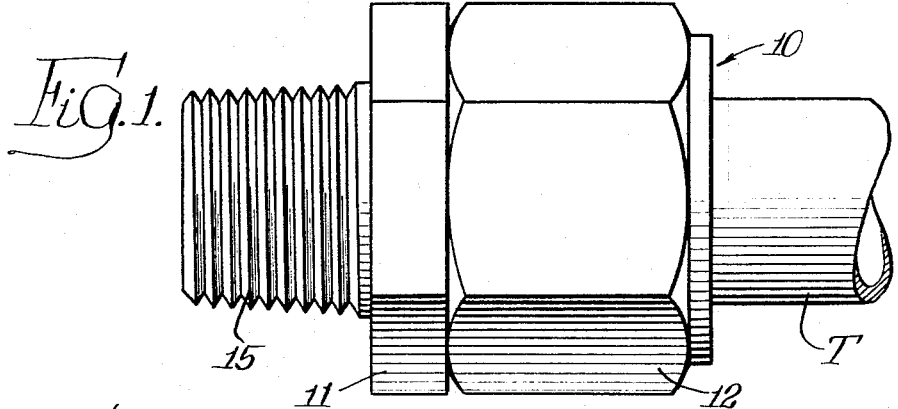
FIGURE 1 is a side elevation of a tube fitting embodying the invention having a portion of a tube connected thereto.

In the exemplary embodiment of the invention as disclosed in the drawing, a fitting generally designated 10 is shown to comprise a body member 11, a nut member 12, a sleeve 13, and a gripper 14. The nut member is arranged for cooperation with the body member to force the gripper toward the body member and thereby forcibly urge the sleeve into sealing engagement with each of the body member and the tube while resiliently supporting the tube in the fitting. The invention comprehends an improved sleeve and gripper structure providing an improved resilient sealed connection of the tube to the body member in the fitting.

Figure 2:
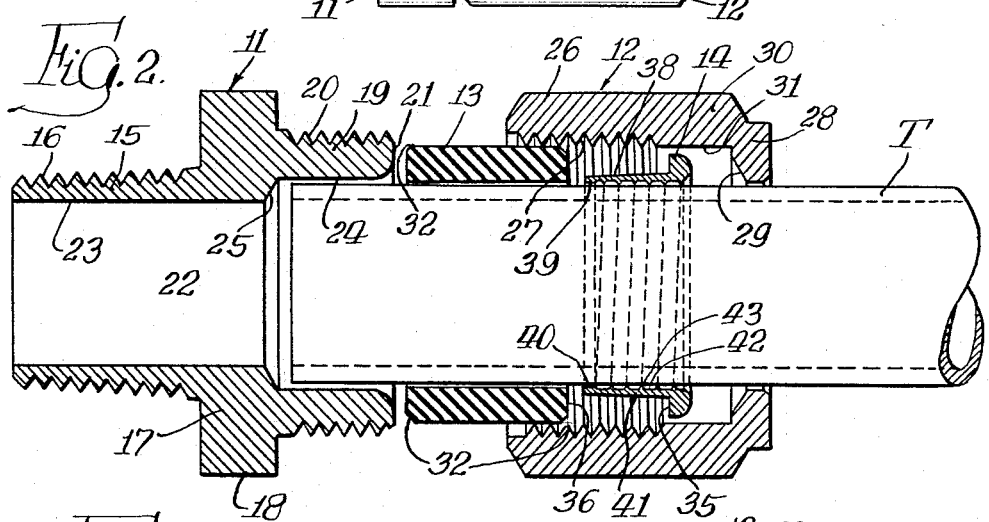
FIGURE 2 is a diametric section of the fitting as arranged at the beginning of the make-up thereof.

More specifically, the body member 11 includes an inner end portion 15 which may be provided with a suitable thread 16 for connection to another member (not shown) to which the tube T is to be connected. The body member further defines a radially enlarged middle portion 17 having a plurality of tool engaging flats 18 defining its outer surface for cooperation with a tool, such as a wrench, during the make-up of the fitting. The outer end 19 of the body member is provided with an external thread 20 and terminates in a radially extending end surface 21. A bore 22 extends through the body member and includes an inner portion 23 extending through the inner portion 15 and middle portion 17 of the body member. The outer portion 24 of bore 22 is diametrically larger than the inner portion 23 and is connected to the inner portion by a frusto-conical portion 25 at the inner end of the outer portion 19 of the body member. The bore portion 24 opens coaxially into the end surface 21 of the body member, as best seen in FIGURE 2.

The nut member 12 includes an inner end portion 26 defining an internal thread 27 arranged for threaded engagement with the thread 20 of the outer portion 19 of the body member. The outer end 28 of the nut member comprises an inturned flange defining an axially inwardly facing frusto-conical shoulder 29. As best seen in FIGURE 2, each of the bore portion 24 of body member 11 and the internal diameter of the flange end portion 28 of the nut member is slightly greater than the outside diameter of the tube T. Between the inner end 26 and the outer flange end 28 of the nut member, the nut member is provided with a mid-portion 30 having a cylindrical inner surface 31 having a diameter approximately equal to the tip diameter of the teeth 27 of the inner end 26 of nut member 12.

Sleeve 13 comprises a resilient annular member formed of a material such as synthetic rubber. Herein the sleeve is formed of high tensile rubber having a tensile strength of at least approximately 2500 p.s.i. The sleeve is preferably relatively hard having a Shore A scale durometer hardness of approximately 85 to 95. To preclude extrusion to between thread 27 and thread 20, the outside corners 32 of the sleeve are preferably chamfered. In the illustrated embodiment, the corner chamfer is approximately 1/64 of an inch deep at an angle of 45 degrees. As shown in FIGURE 2, the inside diameter of the sleeve is preferably slightly greater than the outer diameter of the tube T.

Figure 3:
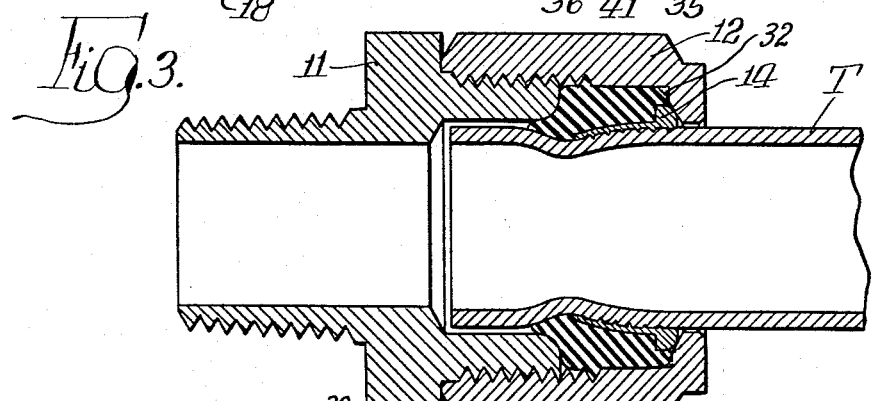
FIGURE 3 is a diametric section of the fitting as arranged upon completion of the make-up.
Figure 4:
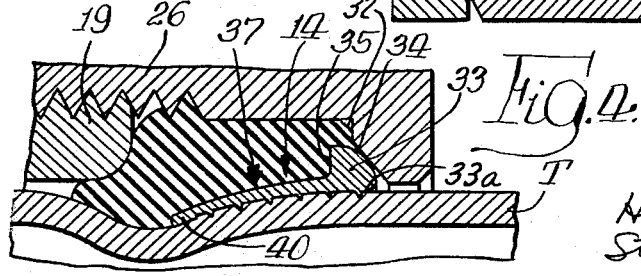
FIGURE 4 is a fragmentary enlarged diametric section illustrating a portion of the fitting in greater detail.

The annular gripper 14 provides for facilitated assembly of the fitting 10. The gripper is preferably formed of a relatively hard material such as cold rolled steel. The gripper 14 includes an outer end 33. Gripper end 33 defines an axially outer bearing surface 34 of circular section (as seen in FIGURE 4) arranged to be engaged by the shoulder 29 of nut member flange 28 when the nut is threadedly advanced on the body member thread 20 to urge the flange 28 coaxially toward the body. The gripper end 33 further defines an axially inner radial shoulder 35 which bears against the outer end 36 of the sleeve 13 as a result of this axially inward movement. The inner portion 37 of the gripper comprises a thin tubular wall having a frusto-conical outer surface 38 narrowing axially inwardly, herein at an angle of approximately 1½°, and extending inwardly from radial shoulder 35. At its innermost end, the portion 37 is provided with an inturned constrictible annular tip 39 having a cylindrical inner surface 40. Between constrictible portion 39 and shoulder 35, the inner portion 37 of the gripper is defined by a deflectable portion 41 having a radially inner cylindrical surface 42 having a diameter larger than the diameter of the cylindrical surface 40 of the constrictible tip 39. Means 43 are provided in the gripper for projecting radially inwardly from the surface 42 to bite into the wall of the tube T when the inner portion 37 is deflected inwardly, as shown in FIGURE 3 in the made-up arrangement of the fitting. Herein, means 43 comprises a rib extending generally circumferentially on surface 42, which rib as illustrated may comprise a thread such as a 60°–16 pitch scratch thread. As shown in FIGURE 2, the unconstricted inner diameter of the thread 43 is substantially equal to the outer diameter of the tube T.

As best seen in FIGURE 4 in the made-up arrangement of the fitting, the tip portion 40 bears constrictively against the tube wall to provide a positive engagement of the deflectable portion therewith, while the thread 43 digs into the tube wall to lock the gripper against axial movement relative to the tube. The tapered surface 38, as illustrated in FIGURES 2 and 3, causes the gripper to move under the sleeve during the make-up of the fitting so as to provide a resilient mounting of the gripper and tube end in the fitting. In addition, the tapered structure of the gripper portion 37 provides a facilitated constriction thereof to the position shown in FIGURES 3 and 4 during make-up of the fitting, thereby facilitating the connection of the tube to the fitting.

The fitting 10 is extremely simple and economical of manufacture. The sleeve 13 is extremely inexpensive as it requires no special molds or the like, but rather can be cut from tubular rubber stock. The high tensile strength of the rubber provides an improved positive sealed support of the tube while yet providing the highly desirable flexibility to resist vibration.

In making up the fitting, the nut, gripper and sleeve are firstly installed in that order on the end of the tube T, as illustrated in FIGURE 2. The end of the tube is then brought into the body member bore portion 24, as shown in FIGURE 2, and the nut portion 26 is then threaded onto the body member portion 19 to the made-up position of FIGURE 3. As the nut advances to the made-up position, it forces the inner portion 37 of the gripper 14 under the sleeve in the manner illustrated in FIGURE 4 to effectively mount the tube and gripper in the sleeve to provide the desired resilient connection of the tube to the fitting.

While we have shown and described one embodiment of our invention, it is to be understood that it is capable of many modifications. Changes, therefore, in the construction and arrangement may be made without departing from the spirit and scope of the invention as defined in the appended claims.

We claim:
1. A fitting for resiliently connecting a tube, comprising:
 a body member having an outer end portion and a flow passage opening coaxially through said end portion;
 a nut member having an inner end, a bore opening through said inner end, and an outer portion defining an axially inwardly facing, axially outwardly narrowing frusto-conical bore shoulder;
 means for connecting said inner end of the nut member to said outer end of the body member;
 a resilient annular sleeve in said bore, said sleeve having an outer end abutting said shoulder, and an inner end abutting said body member end portion coaxially of said flow passage, said sleeve having a Shore A scale hardness of at least approximately 85; and
 an annular gripper having an outer end defining a convex rounded axially outer bearing surface engaged by said frusto-conical shoulder of the nut member to urge the gripper axially inwardly as an incident of axially inward movement of the nut member relative to the body member, an axially inner radial shoulder engaging said outer end of the sleeve, and an inner portion comprising a thin tubular wall having a frusto-conical, axially inwardly narrowing, radially outer surface, an axially inner, constrictible tip portion defining an annular, radially inwardly extending projection having a radially inner cylindrical surface, an axially outer deflectable portion defining a radially inner cylindrical surface having a diameter larger than that of said cylindrical surface of the tip portion and a helical thread projecting radially inwardly from said cylindrical surface of said outer deflectable portion for biting into a tube extending coaxially in said nut member bore, said gripper, and said sleeve, said inner portion of the gripper being arranged in the made-up arrangement of the fitting to extend coaxially within and be transaxially resiliently supported by said outer end of the sleeve and said inner portion of the gripper being arranged to constrictively deform the inner portion of the sleeve and the tube and transaxially resiliently support the tube in said sleeve, said outer end of the sleeve being forced between said rounded outer bearing surface of the gripper and said frusto-conical shoulder of the nut member in the made-up arrangement of the fitting, said convex surface of the gripper engaging said frusto-conical shoulder of the nut member with annular line contact when the parts are first assembled and in substantially no load condition on said sleeve, said line contact moving progressively radially inwardly on the convex surface as full made-up condition is approached.

2. The fitting of claim 1 wherein said sleeve is formed of a material having a tensile strength of at least approximately 2500 p.s.i.

References Cited by the Examiner

UNITED STATES PATENTS

| | | | |
|---|---|---|---|
| 2,351,363 | 6/1944 | Parker et al. | 285—341 X |
| 2,405,822 | 8/1946 | Franck | 285—382.7 X |
| 2,529,552 | 11/1950 | Herold | 285—382.7 |
| 2,693,377 | 11/1954 | Wurzburger | 285—343 |

CARL W. TOMLIN, *Primary Examiner.*

EDWARD C. ALLEN, *Examiner.*

T. A. LISLE, *Assistant Examiner.*